P. FILIPIETZ.
UNIVERSAL COUPLING FOR SHAFTS.
APPLICATION FILED MAR. 31, 1914.
1,135,510. Patented Apr. 13, 1915.
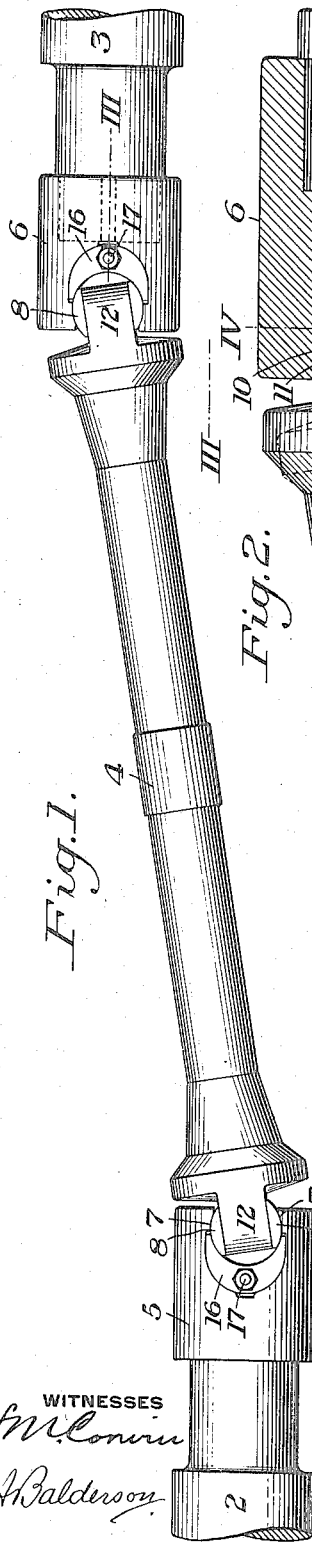
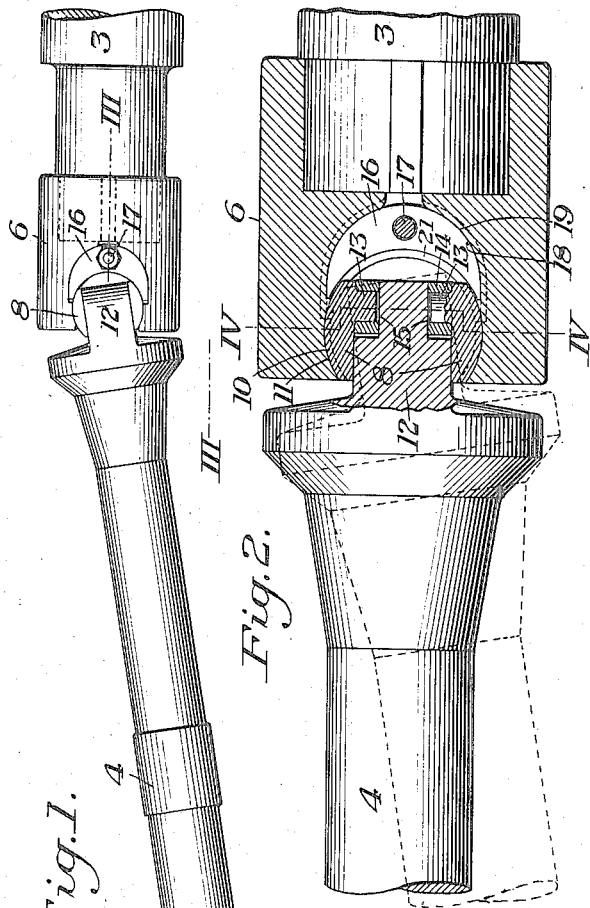
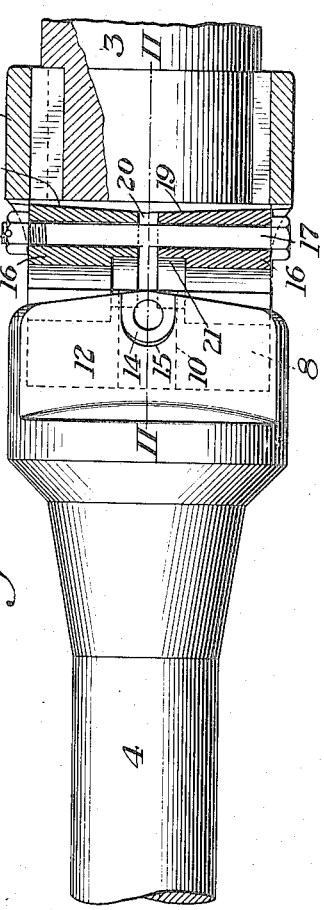
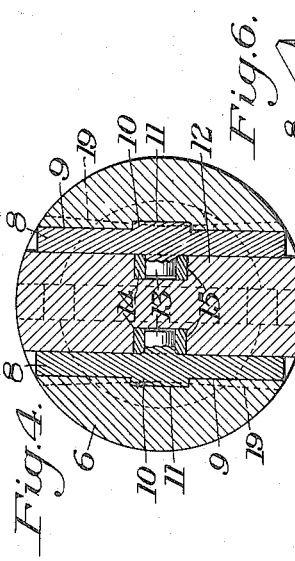
WITNESSES
INVENTOR
Paul Filipietz

UNITED STATES PATENT OFFICE.

PAUL FILIPIETZ, OF PITTSBURGH, PENNSYLVANIA, ASSIGNOR TO MESTA MACHINE COMPANY, OF PITTSBURGH, PENNSYLVANIA, A CORPORATION OF PENNSYLVANIA.

UNIVERSAL COUPLING FOR SHAFTS.

1,135,510.  Specification of Letters Patent.  Patented Apr. 13, 1915.

Application filed March 31, 1914. Serial No. 828,498.

*To all whom it may concern:*

Be it known that I, PAUL FILIPIETZ, a resident of Pittsburgh, in the county of Allegheny and State of Pennsylvania, have invented a new and useful Improvement in Universal Couplings for Shafts, of which the following is a full, clear, and exact description, reference being had to the accompanying drawings, forming part of this specification, in which—

Figure 1 is a side elevation of a shaft coupling embodying my invention. Fig. 2 is a view partly in side elevation and partly in section, the plane of section being on the line II—II of Fig. 3, of one end portion of the coupling. Fig. 3 is a view, taken at right angles to Fig. 2 with certain of the parts in section, the section being taken on the irregular line III—III of Fig. 1. Fig. 4 is a section on the line IV—IV of Fig. 2. Fig. 5 is a perspective view of one of the wedge members, and Fig. 6 is a view of one of the bearing members.

My invention has relation to universal couplings for shafts; and while it has been particularly designed as a coupling for use in the driving shafts of vertically adjustable mill rolls, it is equally well adapted for use generally in connecting any two shaft members which are out of alinement with each other.

The object of my invention is to provide a universal coupling of this character which will take care, when necessary, of wide changes in the positions of the shaft members to be coupled, without binding or undue strain on the parts; in which the parts are extremely simple and can be readily manufactured and assembled and disassembled; and which will in other respects meet the requirements of a coupling of this character.

In the accompanying drawings the numeral 2 designates one of the shaft members to be coupled, 3 the other shaft member, and 4 the connecting member or spindle of the coupling. In the present instance the member 3 is shown as being the neck of a mill roll, and the member 2 is a shaft which drives said roll. Secured to or formed with the end portion of the shaft 2 is an end member 5.

6 is a similar end member rigidly connected to or formed with the roll neck 3. While the end members 5 and 6 may, as just stated, be formed integral with the members 2 and 3, their construction is such, as will hereinafter appear, that they can be readily formed separately and rigidly keyed to the shaft members. This in an important advantage from a construction and maintenance standpoint, since it saves the necessity of turning and otherwise machining these end members integral with the roll neck or with a heavy shaft. Furthermore, in case of breakage of the parts, or when a roll becomes worn out, the end member can be readily removed and applied to a new roll.

Each of the end members 5 and 6 has an axially extending opening therein. A portion of the wall of each of these openings is formed with the opposite concave bearing surfaces 7 for the movable bearing members 8. Each of these bearing members has a corresponding convex surface 9, the member being in the form of a segment of a cylinder. To prevent endwise movement of these bearing members, they are preferably provided with the central convex ribs or enlargements 10 which engage corresponding offsets 11 in the walls of the bearing surfaces of the end members.

The connecting member 4 is formed with a reduced extension 12 at each end having substantially parallel opposite flat sides, against which bear the inner flat surfaces of the bearing members 8. Each bearing member has a stud 13, preferably formed integrally therewith which engages a bushing 14. These bushings are seated in cutaway portions 15 at opposite sides of the flattened end extensions 12. The studs and their bushings are preferably as near the ends of the flattened extensions 12 as possible, so that there is substantially no projecting arm of said extensions behind the pivotal center of said studs. This reduces to a considerable extent the amount of clearance which it is necessary to provide in the end members in order to take care of the angular movements of the coupling member 4.

It will be seen that changes in the angular position of the coupling member 4 in one plane is effected by a pivotal movement on the studs 13; while angular movement in a plane at right angles thereto is on the coacting bearing surfaces of the members 9; and that these two bearings provide for a complete universal movement.

In order to take up undue wear and looseness of the parts, each of the members 5 and 6 is provided with an adjusting device of the character now to be described. The opening in each of the end members beyond the concave bearing surfaces 7 is shaped to receive two transversely extending wedges 16 inserted from opposite sides and adapted to be tightened by any suitable means such as a through bolt 17. Each of these wedges has the beveled wedging surface 18, and the adjacent wall of the opening has the coöperating wedging surfaces 19. Clearance is provided at 20 between the inner ends of the two wedges; and the inner end portion of each wedge is shown as cut away at 21 to give ample clearance for the movement of the parts. I prefer to make these wedges crescent shape in cross section since this form reduces to a minimum the extent to which the end members must be cut away to seat the wedges. This form gives an efficient bearing surface between the convex faces of the wedges and the walls of the end member, while leaving a maximum amount of metal in the latter. The inner concave faces of the wedges are shaped to have a bearing fit with the convex surfaces 9 of the members 8, and form a continuation of said surfaces 7. These surfaces are on a radius taken from the same center as the concave surfaces 7. It will be readily seen that when the wedges are tightened they will act to take up all wear and undue looseness both between the convex surfaces of the members 8 and their coöperating bearing surfaces, and also all undue looseness between the flat inner surface of the members 8 and the flat sides of the extensions 12. The one simple adjustment therefore takes care of the entire adjustment at each end of the coupling.

With the wedges loosely inserted, the members 8 can be readily seated while engaged with the bushings 14 and the wedges can then be tightened to the proper extent. By loosening the wedges the coupling can be readily and quickly taken apart. It will be noted that the bushings 18 are set in open recesses or cut-away portions of the end extensions 12 so that the coupling member 4 can be readily inserted and removed. This also permits of a slight endwise movement of the coupling member with respect to the end members.

The construction is extremely simple and efficient. The parts are few in number and can be readily constructed and assembled. Any part can be readily removed and replaced in case of breakage or undue wear. It will be noted that there are no through pins or other connecting parts of a character to cause binding, and that the member 4 is perfectly free to move through a very considerable angle without in any way binding or placing strain on the parts or interfering with its proper action as a power transmitting medium. The mode of adjustment is, as above pointed out, exceedingly simple and efficient.

I do not desire to limit myself to the precise construction and arrangement of the parts as herein shown and described, since it is obvious that various changes can be made in the details without departing from the spirit and scope of my invention.

I claim:

1. A universal shaft coupling, comprising an end member having an opening therein formed with opposite concave bearing surfaces, bearing members having a movable bearing on said concave surfaces, a coupling member having an end portion extending between the bearing members and connected thereto by pivotal connections which are carried wholly by the coupling member and the bearing members, and opposite transversely movable wedge members seated in the end member and having bearing surfaces which engage the outer bearing surfaces of the bearing members; substantially as described.

2. A universal shaft coupling, comprising an end member having an opening therein formed with opposite concave bearing walls, bearing members having convex outer bearing surfaces which have a movable bearing on said walls, a coupling member having an end portion which extends between and is pivotally connected to said bearing members, and crescent-shaped wedge members seated in the end member and having inner concave bearing surfaces which form a continuation of the concave bearing surfaces of said opening; substantially as described.

3. A universal shaft coupling, comprising an end member having a socket therein formed with opposite concave bearing surfaces, and having an inner portion which is of a diameter at least as great as the maximum diameter of said bearing surfaces, opposite bearing members each having a movable bearing on one of said concave surfaces, a coupling member extending between the two bearing members and connected thereto by pivotal connections which are carried wholly by the coupling member and the bearing members, and laterally movable wedge members in the inner portion of said socket, said wedge members having each a curved bearing surface which forms a continuation of the adjacent concave bearing surface of the socket, together with means for tightening and releasing said wedge members; substantially as described.

4. A universal shaft coupling, comprising an end member having a socket therein formed with opposite concave bearing surfaces, and having an inner portion which is of a diameter at least as great as the maximum diameter of said bearing surfaces, opposite bearing members each having a movable bearing on one of said concave surfaces, a coupling member extending between the two bearing members and connected thereto by pivotal connections which are carried wholly by the coupling member and the bearing members, and laterally movable wedge members in the inner portion of said socket, said wedge members having each a curved bearing surface which forms a continuation of the adjacent concave bearing surface of the socket, said wedge members being inserted and movable from opposite sides of the end member; substantially as described.

5. A universal shaft coupling, comprising an end member having a socket therein formed with opposite concave bearing surfaces, and having an inner portion which is of a diameter at least as great as the maximum diameter of said bearing surfaces, opposite bearings members each having a movable bearing on one of said concave surfaces, a coupling member extending between the two bearing members and connected thereto by pivotal connections which are carried wholly by the coupling member and the bearing members, and laterally movable wedge members in the inner portion of said socket, said wedge members having each a curved bearing surface which forms a continuation of the adjacent concave surface of the socket, and being of crescent shape in cross-section; substantially as described.

In testimony whereof, I have hereunto set my hand.

PAUL FILIPIETZ.

Witnesses:
H. F. MILLER,
G. E. TOWNSEND.

Copies of this patent may be obtained for five cents each, by addressing the "Commissioner of Patents, Washington, D. C."